P. BOSEN.
AUTOMATIC GATE LATCH.
APPLICATION FILED DEC. 23, 1913.

1,094,637.

Patented Apr. 28, 1914.

Inventor
P. Bosen.

UNITED STATES PATENT OFFICE.

PETER BOSEN, OF SLAYTON, MINNESOTA.

AUTOMATIC GATE-LATCH.

1,094,637.

Specification of Letters Patent. Patented Apr. 28, 1914.

Application filed December 23, 1913. Serial No. 808,356.

*To all whom it may concern:*

Be it known that I, PETER BOSEN, a citizen of the United States, residing at Slayton, in the county of Murray and State of Minnesota, have invented certain new and useful Improvements in Automatic Gate-Latches; and I do hereby declare the following to be a full, clear, and exact description of the invention, such as will enable others skilled in the art to which it appertains to make and use the same.

This invention relates to new and useful improvements in automatic gate latches, and has for its object the provision of a device which will hold a gate from movement unless the latch is properly operated.

Another object of my invention is the provision of a device of the above character which can only be operated when the proper position of the latch which relates to the gate, is reached.

A further object of my invention is the provision of a novel combination and arrangement of parts which may be attached to a gate of the ordinary character and will effectively operate without changing the construction of the gate in any way.

A further object of my invention is a novel method of mounting the latch on the gate post by means of which the same will be held in its adjusted position.

Figure 1:
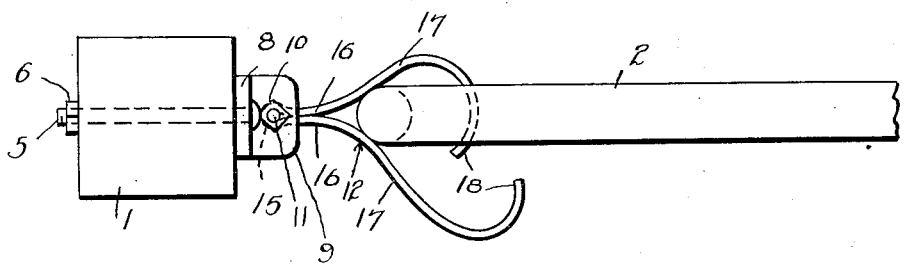
Figure 2:
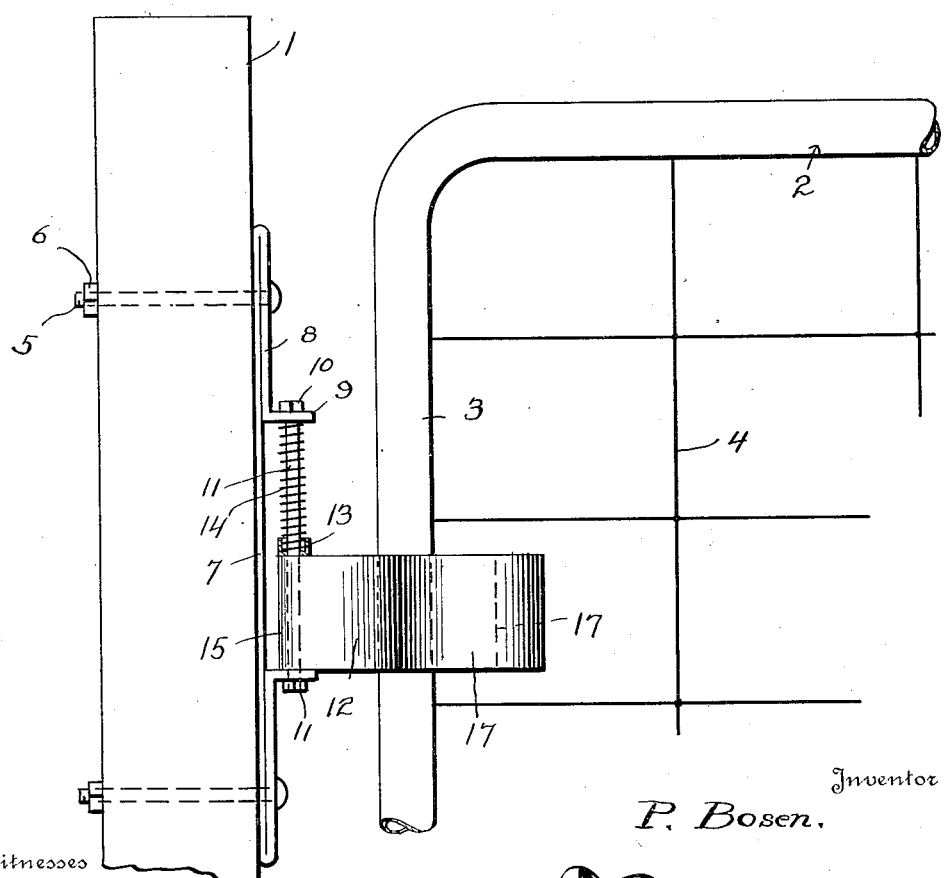

With the above and other objects in view, I will now proceed to describe my invention in the following specification and accompanying drawings, in which, Figure 1 is a top plan view of a gate post showing my improved latch applied thereto, and Fig. 2 is a front view in elevation of a fragment of a gate post showing the latch thereon and a portion of a gate as it would appear in its locked position.

Referring to the drawings by characters of reference, 1 indicates the gate post of the usual type with which the gate 2 is adapted to coöperate. The gate preferably comprises the iron frame 3 in which the cross wires 4 are mounted.

The gate post previously referred to by the numeral 1 is preferably provided with a pair of transversely extending apertures through which the bolt 5, having the nuts 6 coöperating therewith, are adapted to pass. A suitable plate 7 is secured to the post by means of the bolt and is provided with the extensions 8 which are bent back upon themselves as clearly shown in Fig. 2.

Each of these extensions is provided near its free end with the angularly extending portions 9 which in turn is provided with a suitable aperture which will be more fully hereinafter described.

Extending through the apertures in the projection 9 and provided at each extremity with the nut 10 I preferably provide a suitable bolt 11 which is adapted to form a pivot for the latch, indicated generally by the numeral 12, when the device is in use. A suitable cup 13 is provided with a centrally located aperture adapted to form the lower abutment for the spring 14 which exerts downward pressure thereagainst and thereby holds the latch in its adjusted position.

The latch 12 above mentioned, is preferably formed of a single piece of cut metal as will be clearly seen upon referring to Fig. 1, and is bent as clearly shown to form a loop 15 which is adapted to surround the pivot 11. The free ends of the loop 15 are extended as clearly shown at 16 and bent outwardly as shown at 17 to form the loop against which the end of the frame 3 of the gate are adapted to rest when the device is in use. Each of these portions 17 is bent as shown at 18 to form hook members which are adapted to engage the end member of the frame 3 of the gate and hold the same from being swung in either direction. One of the extensions is preferably made longer than the other as clearly illustrated in Fig. 1 and it will be obvious that until the latch has swung to its proper position, it will be impossible for the gate to be opened.

It will be clearly seen from the foregoing, that when it is desired to make use of my improved device the plate 7 is secured to the gate post 1 by means of bolts and nuts 5 and 6 respectively. The latch is then placed in position with the loop 15 bearing against the cup and it will be obvious when the end of the frame 3 of the gate is between the portions 17 of the latch member, the gate will be held immovable and will remain so until a person knowing the proper relation of the ends 18 with the frame 3 has swung the latch, at which time the end of the frame 3 of the gate may be swung and will turn freely through the space formed between the ends 18 of the latch.

While in the foregoing I have shown and described the preferred embodiment of my invention, I wish it to be understood that I may make such changes in the combination and arrangement of parts as may fall within the scope of the claims here submitted.

Having thus described my invention, I claim:

1. In a device of the character described, a plate, ears formed integral with the plate intermediate its ends, a pin secured between the ears, a coiled spring surrounding the pin, a cup at the lower end of the coiled spring, and a latch member comprising a loop, a pair of arms formed integral with the loop, said arms extending outwardly with relation to the loop and bent to form a pair of spaced loops between which the end of the gate is adapted to be held when the device is in use.

2. In a device of the character described the combination with a fence post of a pin, means carried by the fence post to support the pin, a coil spring surrounding the pin, a cup at the lower end of the coil spring, a latch member comprising a loop, a pair of arms formed integral with the loop, said arms extending outwardly with relation to the loop and bent to form a pair of spaced loops between which the ends of the gate is adapted to be held when the device is in use.

In testimony whereof I affix my signature in presence of two witnesses.

PETER BOSEN.

Witnesses:
Wm. M. Stevens,
W. J. McLeod.

---

Copies of this patent may be obtained for five cents each, by addressing the "Commissioner of Patents, Washington, D. C."